UNITED STATES PATENT OFFICE.

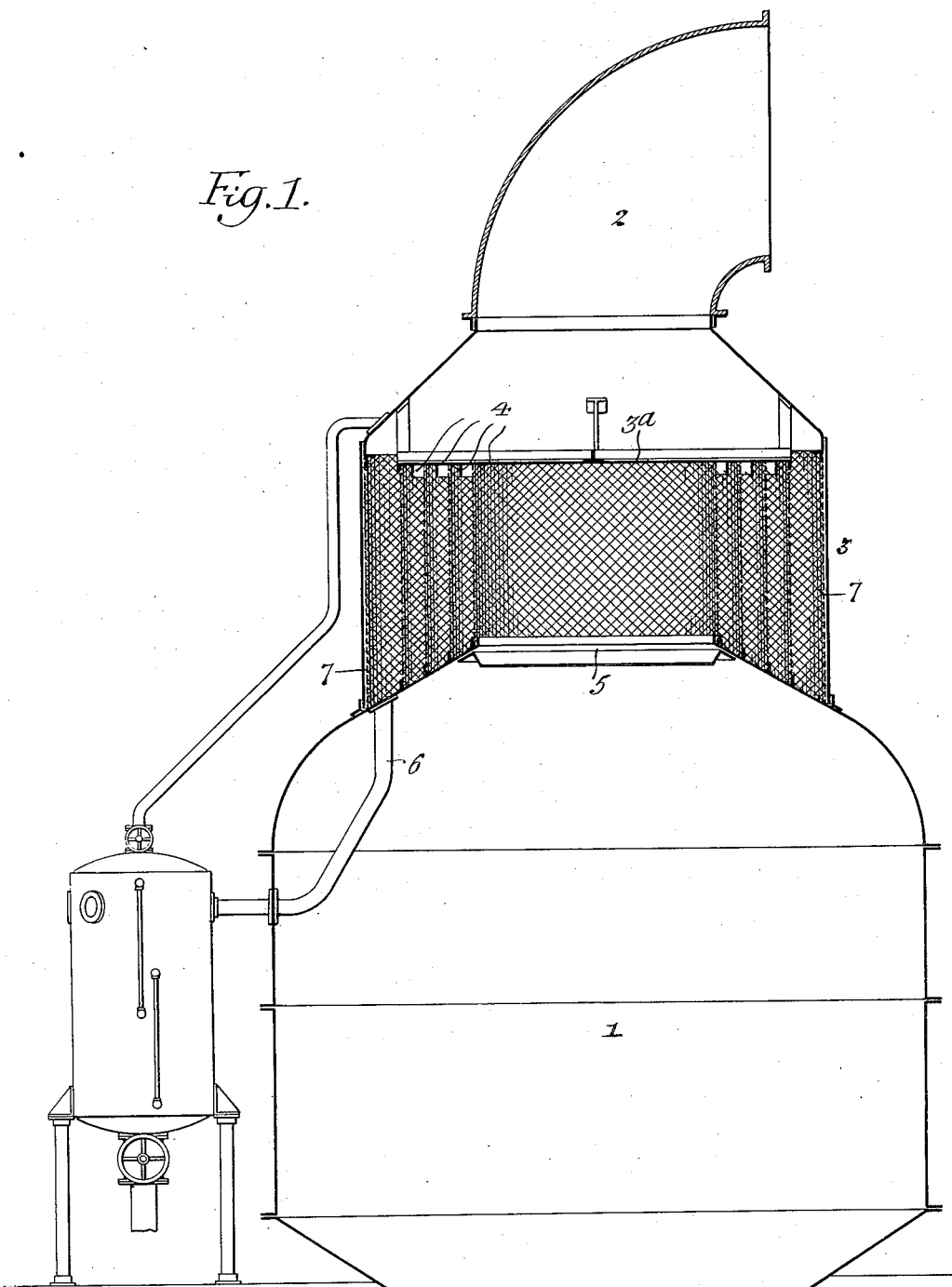

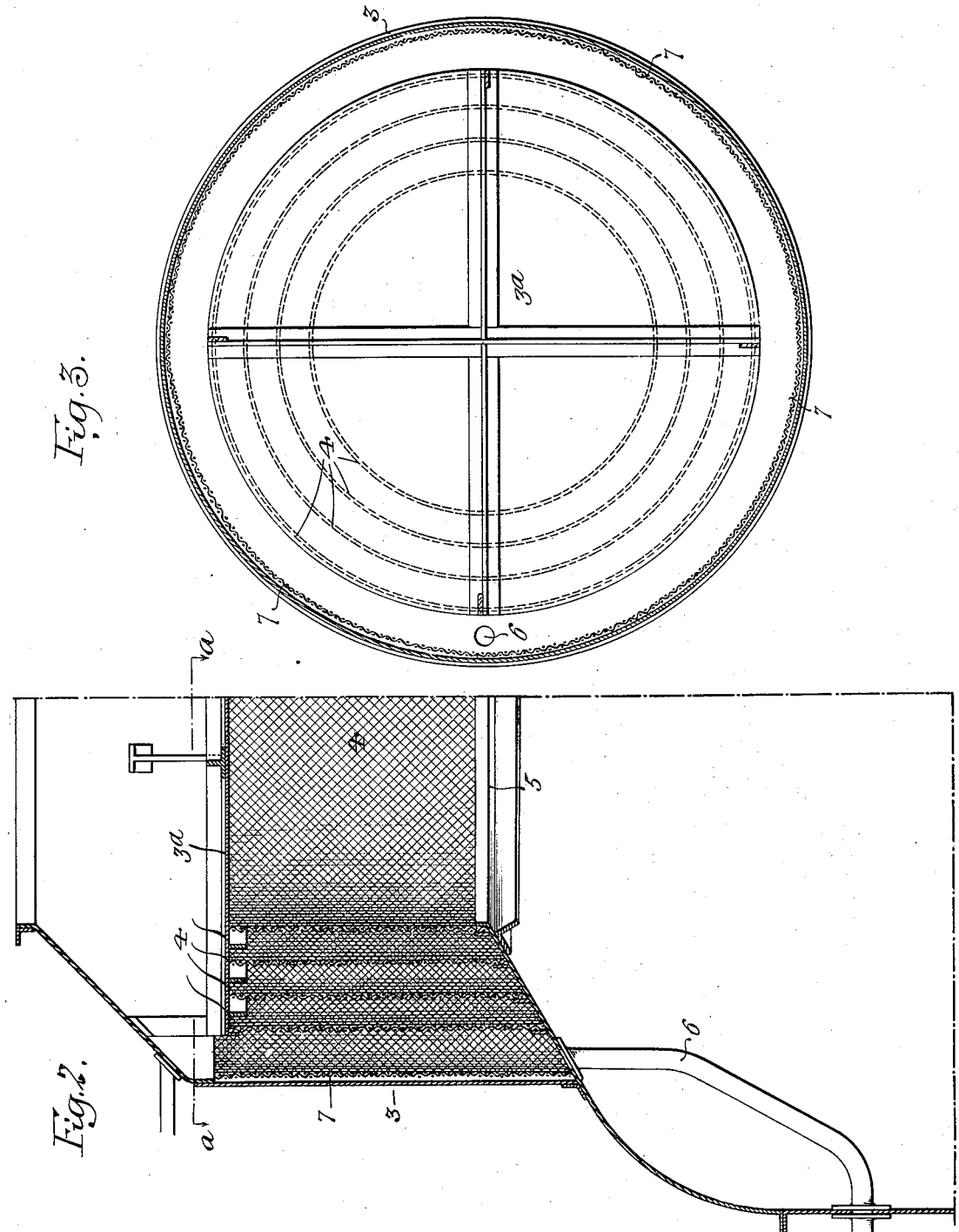

GEORGE M. NEWHALL, OF PHILADELPHIA, PENNSYLVANIA.

SEPARATOR FOR VACUUM-PANS.

1,015,704.  Specification of Letters Patent.  Patented Jan. 23, 1912.

Application filed December 19, 1910. Serial No. 597,992.

*To all whom it may concern:*

Be it known that I, GEORGE M. NEWHALL, a citizen of the United States, residing in Philadelphia, Pennsylvania, have invented certain Improvements in Separators for Vacuum-Pans, of which the following is a specification.

My invention relates to separating means for use with vacuum pans, and my present invention consists of certain improvements in the apparatus forming the subject of my application for patent filed September 2, 1910, Serial No. 580,233.

In the boiling or evaporation of liquids which have a tendency to entrain with the vapor produced during the boiling operation, there is danger that the entrained material will be carried to another effect or to the condenser, and it is desirable to employ with the apparatus in which evaporation takes place, means for separating any entrained liquid from the vapor. This and other features of my invention are more fully set forth hereinafter, reference being had to the accompanying drawings, in which:

Figure 1, is a sectional elevation of a vacuum pan equipped with my improved means for preventing entrainment of the liquid undergoing evaporation or other treatment; Fig. 2, is an enlarged view of a portion of the structure shown in Fig. 1, and Fig. 3, is a sectional plan view on the line *a—a*, Fig. 2.

In my application for patent before referred to, I have shown a series of cylindrical screens disposed in the upper portion of a vacuum pan through which screens all of the escaping vapor must pass before it gains entrance to an outlet pipe for passage to the next effect or to the condenser; such screens being designed to contact with, collect and carry off by capillary attraction any and all particles of liquid entrained with the vapor. In the construction illustrated in my pending application, the vapor emerging from the last screen may and in most instances does strike the surface of the shell forming the separating chamber. It may happen, however, that the vapor emerging from the last screen will carry some particles of liquid which it may be desirable to collect, but which may be lost by the current licking up the same, and the purpose of my present invention is to insure the collection of all particles of liquid which may be carried up by or with the vapor.

In the drawings herewith, 1 represents a vacuum pan of any suitable construction, in which sugar juices or other liquids may be boiled for the purpose of effecting evaporation or concentration of the same. 2 is an elbow connection of a vapor pipe or passage leading to another effect or to the condenser, and 3 represents an intermediate section or chamber containing the separating means, which chamber may be partly formed by a top plate $3^a$ substantially centrally disposed in the pan with a substantially annular space around it for the passage of vapor.

In the present instance, as in the application before referred to, said separating means may comprise a series of screens. In the present instance these screens may be substantially vertical cylinders, arranged substantially concentric to each other and spaced apart a slight distance. These screens in the present embodiment of my invention are four in number, indicated at 4, but it will be understood that conditions may arise permitting the reduction in number, while other conditions may require a greater number. The upper part of the vacuum pan is arched to the opening 5, and the first screen may extend directly therefrom and of substantially the same size. The screens are suitably held between the arched top of the vacuum pan and the top plate $3^a$. The screens 4 are so arranged that all the vapor arising from the mass of liquid boiling in the vacuum pan, must pass through the same before gaining access to the vapor pipe for delivery to the next effect or to the condenser. It is particularly to be noted that the screens are of successively increasing area so that the vapor flows initially through the one offering the smallest area for its passage and passes successively to screens of greater area; finally emerging through the screen offering the greatest area. For example, in the present instance the first screen passed through has a little more than half the area possessed by the last one, and if desired the apertures of the succeeding screens may be successively increased in size.

Under operating conditions, the vapor rising from the boiling solution must pass through the several screens before gaining access to the pipe leading to the next effect or to the condenser, and with such an arrangement the screens will catch the liquid particles entrained with the vapor; such action being facilitated by the decrease in velocity of the vapor current as it passes from one screen to another. Such liquid particles, under the action of capillary attraction, aid in the deposit of further particles from the succeeding volumes of vapor current, and as they increase in size will flow into the lower part of the chamber in which the screens are located to a pipe 6. From thence, the liquid may pass into a suitable feed chamber or to another portion of the evaporator, while the vapor, free of entrained particles of liquid, will pass through the elbow 2 to the next effect or to the condenser.

In addition to the screens 4, I may, and preferably do provide the wall of the chamber 3 with another screen 7, spaced from the wall a slight distance and designed to serve as a final collector of any portions of liquid which may be carried by the vapor against such wall. By this means, any spray which might be deposited upon the outer wall of the evaporator under normal conditions would be prevented from being licked up again by the force of the current and carried out with the escaping vapor from the vacuum pan.

The purpose of the screen 7 in the separating chamber of the vacuum pan is to hold back, by capillary attraction, any spray or liquid drops which might be carried by the rush of the vapor current through the other screens and across the annular space surrounding the last or outer screen 4. Without the screen 7 it would be quite possible that the current would deposit very little spray upon the outer wall of the evaporator, and whatever was deposited might be licked up again by the force of the current and carried out with the escaping vapor from the evaporator, instead of throwing down the liquid solution which should be collected. Besides this, there is very little capillary attraction in a wall surface compared with the meshes of the screen placed adjacent the wall. At the same time, this screen should stand off from the wall a slight distance, say one-quarter to one-half inch, or so, in order to allow the vapor to completely surround the screen and permit contact of any entrained liquid therewith. Another benefit in the use of this outer screen is that its area, owing to its increased diameter, is much greater than any of the other screens. In fact, it becomes a very important adjunct to pick up any valuable spray carried completely through the inner screens 4.

The screens 4 are illustrated as cylindrical and this is the preferable arrangement. However, they might be rectangular, oval, ellipsoidal or present any polygonal section in plan so long as they serve the function of straining all the vapor passing from the pan for the purpose of collecting any and all liquid entrained therewith. They are preferably vertically arranged as shown, but they might be otherwise disposed, inclined for instance, curved in vertical cross section or variously shaped in contour, without departing from my invention. The concentricity of the arrangement is not essential and it can well be understood that eccentrically arranged screens may perform the desired function. Moreover they may be in discontinuous sections with radial parts connecting such discontinuous sections to insure screened parts at all points, and a continuous screen, helically coiled, may perform the same function as the series since it presents a plurality of walls for the passage of the vapor. All these constructions and modifications and any equivalent thereof I deem to be within the scope of my invention and to be included in the language employed in my claims.

I do not claim herein the use of a series of annular screens wherein a screen adjacent the outer wall of the casing is omitted, the same being claimed in my earlier application before referred to.

I claim:

1. The combination, with a vacuum pan having a heating chamber with an outlet, a separating chamber between the heating chamber and the outlet and a plurality of screen walls disposed in the separating chamber through which vapor from the heating chamber must pass, of a screen disposed adjacent the wall of said separating chamber and receiving the vaporous body emerging from said plurality of screen walls.

2. The combination, with a vacuum pan having a heating chamber with an outlet, a separating chamber between the heating chamber and the outlet and a plurality of screens disposed in the separating chamber and through which vapor from the heating chamber must pass, of a reticulated or foraminous wall disposed adjacent the wall of said separating chamber and receiving the vaporous body emerging from said screens.

3. The combination of a vacuum pan having a heating chamber with an outlet, a plurality of substantially vertical and substantially cylindrical screen walls interposed between the main body of said chamber and said outlet through which screen walls the vapor must pass, said screens being disposed in a separating chamber, and a screen or layer of wire mesh disposed adjacent the wall of said separating chamber and receiving the vapor passing through said cylindrical screens.

4. The combination of a vacuum pan having a heating chamber, an outlet and a chamber intermediate the heating chamber and outlet, of a reticulated or foraminous wall disposed in said intermediate chamber through which the vapor must pass, and a reticulated or foraminous wall adjacent the wall of the intermediate chamber for contact with the vapor discharging through said internal reticulated wall.

In testimony whereof, I have signed my name to this specification, in the presence of two subscribing witnesses.

GEORGE M. NEWHALL.

Witnesses:
 MURRAY C. BOYER,
 WM. A. BARR.